April 9, 1940.  P. E. MADDEN  2,196,219
CONTROL VALVE FOR BOILER BLOWOFF
Filed May 23, 1938  2 Sheets-Sheet 1
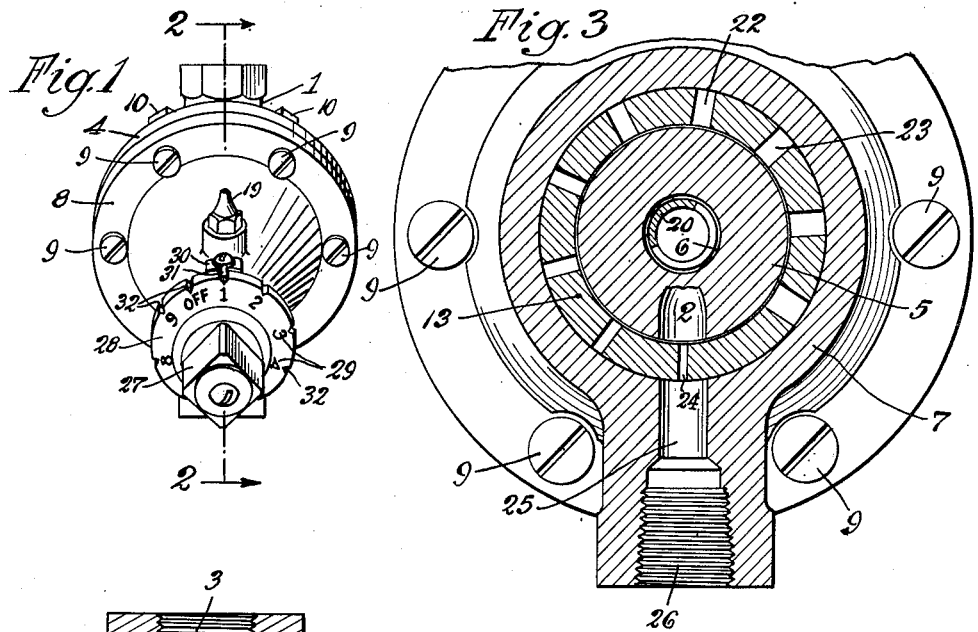
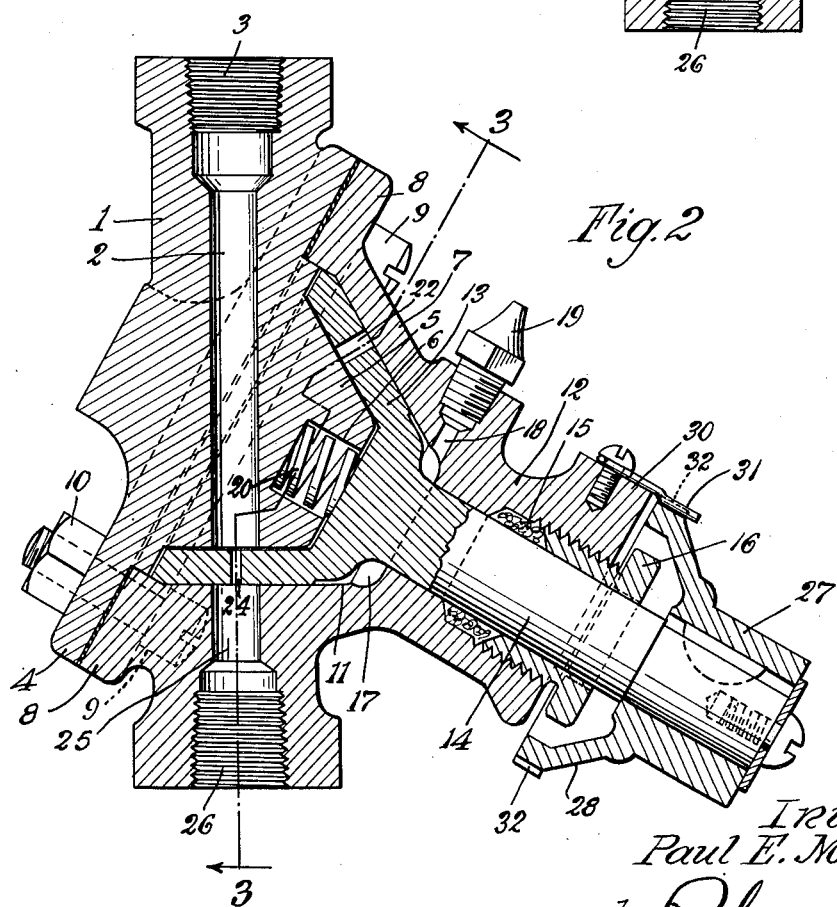
Inventor
Paul E. Madden
by Parker + Carter
Attorneys.

April 9, 1940.　　　P. E. MADDEN　　　2,196,219
CONTROL VALVE FOR BOILER BLOWOFF
Filed May 23, 1938　　　2 Sheets-Sheet 2
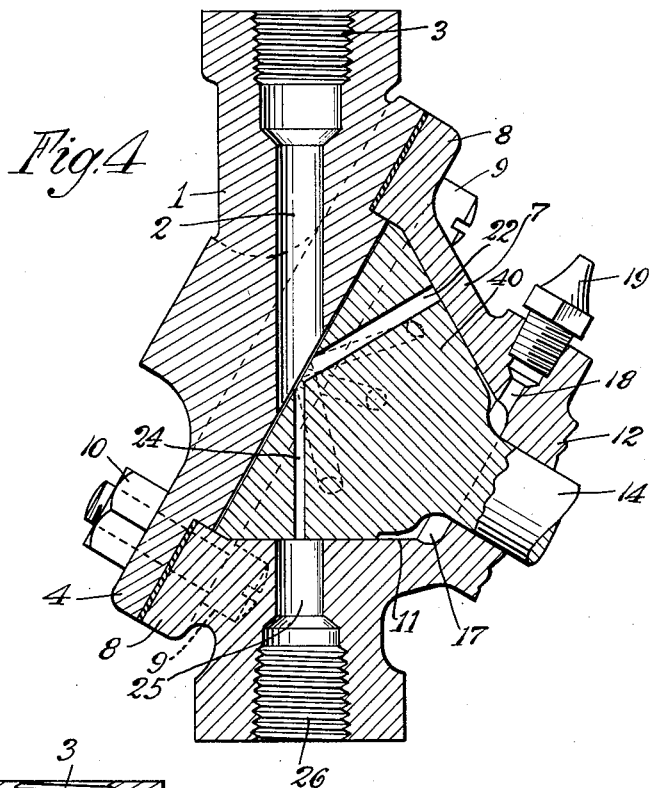
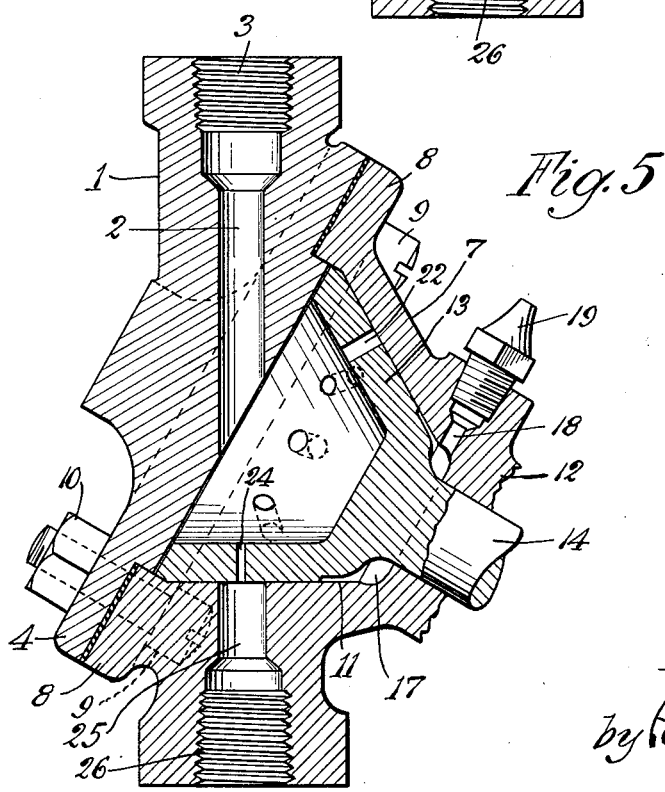
Inventor
Paul E. Madden
by Parker + Carter
Attorneys Patented Apr. 9, 1940

2,196,219

UNITED STATES PATENT OFFICE 2,196,219

CONTROL VALVE FOR BOILER BLOWOFF

Paul E. Madden, Chicago, Ill.

Application May 23, 1938, Serial No. 209,567

6 Claims. (Cl. 251—92)

My invention relates to improvements in control valves and has for one object to provide a new and improved form of valve wherein the rate of flow may be adjusted with micrometric precision through a relatively wide range. Another object is to provide a valve wherein a plurality of adjusting or flow controlling members may be used interchangeably in one mechanism. Another object is to provide a valve which will be simple, durable, proof against leakage and which may be easily repaired, replaced, and adjusted. Other objects will appear from time to time throughout the specification and claims.

My invention is illustrated more or less diagrammatically in the accompanying drawings, wherein—

Figure 1 is a side elevation;

Figure 2 is a section along the line 2—2 of Figure 1;

Figure 3 is a section along the line 3—3 of Figure 2;

Figure 4 is a detailed section similar to Figure 2 showing a modified form; and

Figure 5 is a similar detailed section showing a further modified form.

Like parts are indicated by like characters throughout the specification and drawings.

1 is a valve body. 2 is an internal passage extending through the body terminating at one end in a threaded enlarged socket 3, into which any suitable pipe may be screwed. 4 is a flange encircling the body, the plane of the flange being inclined to the axial line of the passage 2. 5 is a conical hub projecting outwardly from the valve body concentric with the flange 4. The passage 2 terminated in the hub wall. 6 is an aperture concentric with the hub and open at the outer end thereof in which is seated a spring 20. 7 is a cover flanged at 8, in opposition to the flange 4, and adapted to be held on the flange by means of bolts 9, and nuts 10. This cover contains an interior truncated conical aperture or valve seat 11, concentric with and generally conforming in dimensions though spaced from the cone 5. 12 is a packing gland projecting from the cover 7. 13 is a hollow conical metering valve. It is concentric with and is ground or lapped to fit the conical rest 11. 14 is the valve stem carrying the metering valve extending out through the gland 12, and associated with a packing 15 and a packing nut 16. 17 is a lubrication reservoir encircling the base of the cone 13, which communicates with an aperture 18 and a grease fitting 19 through which lubricant may be injected under pressure. The thickness of the conical member and its relation with respect to the cone 13, is in snug close liquid tight fit with the conical surface or rest 11; there is a clearance between the interior portion of the cone 13 and the conical hub 5.

22, 23, 24, etc., are a series of metering apertures or nozzles of different sizes extending through the conical valve member 13. They are, as the cone is rotated, adapted to be brought successively in alignment with the passage 2, so that liquid under pressure which enters the valve through the passage 2, passes on through a metering aperture 24, into a passage 25, which passage terminates in a threaded socket 26 which may receive the threaded end of a pipe. 27 is an adjustment head or nut keyed to the valve stem 14. 28 is an apron extending downwardly from that head enclosing the packing nut 16, and provided about its periphery with a series of numbers or other suitable indications 29. 30 is a base on the gland 12. 31 is a spring on the base adapted to engage in one of the notches 32 associated with the indicating numbers.

When this apparatus is assembled in a steam, air or water line, or the like the pressure of the coil spring insures that the valve cone will be properly seated in the valve cover and insures that any fluid under pressure which enters through the pipe 2, may only escape through one of the selective control nozzles or metering orifices. The interior of the cone will contain the fluid under pressure but there will be no escape along the outer surface of the cone or along the valve stem. The pressure of the fluid itself even without the spring pressure being sufficient to insure a positive seating of the cone in its seat. The adjustment head or nut may be turned by any suitable means to bring any desired nozzle into line with the discharge so that the amount of flow through the valve may be positively controlled by the proper positioning of the nozzle. The notch and spring combination insures that the nozzle will be brought to the approximate center of the passages in the valve so that flow will be controlled only by the nozzle itself.

Each of the nozzles 22, 23, 24, etc., is as shown very much smaller in diameter than the passage 2. The maximum amount of liquid that can pass through the valve is that which can be passed through the passage 2. Hence any nozzle or aperture smaller in diameter than the passage 2, decreases the rate of flow below the maximum and so by using a sufficient number of valve cones each with a plurality of nozzles of various size, it is possible by merely replacing valve cones without any other change in the apparatus, to get the widest possible range of flow rate from a minimum up to a maximum, fixed by the capacity of the passage 2. In actual experience I find that in order to take care of a suitable commercial range of flow variation, two or three to half a dozen valve cones with the nozzles varying in diameter progressively is sufficient and I thus need to carry in stock only one size of valve body and cover, which with a sufficient number of valve cones takes care of substantially all different conditions.

The valve cone and stem and adjusting nut 27, is heavy, stiff and solid enough so that adjustments can be made without reducing pressure though, of course, if the pressure is off, the adjustment can be more easily made.

The lubricating chamber is important because it makes it possible to apply lubricant to the valve at a sufficiently high pressure to insure lubrication throughout substantially the entire area of the cone and because if, as a result of long period of service without change in adjustment, the cone has taken a permanent seat, lubricant can be applied with sufficient force to unseat the valve and permit adjustment.

The metering cone is preferably hollow and there is just enough clearance between the metering cone and the conical hub to prevent contact and binding. Under some circumstances, of course, the conical hub might be omitted and the metering cone be solid, as shown in Figure 4, in which case the metering orifices instead of being relatively short through the thin metering cone wall would be long and extend clear through the body of the solid cone 40. If this arrangement were made then the passage 2, would terminate on a bias. The combination of the bias termination plus the long metering nozzles might under some circumstances be entirely satisfactory but under other conditions be quite undesirable because of eddy currents, resistance in the metering nozzle and the like.

Under other circumstances the conical hub might be omitted and the hollow conical valve still be used as shown in Figure 5, but this would leave an open chamber in the valve which would of course remain at all times filled with the fluid entering through the passage 2. Such changes could of course be made without departing from the spirit of my invention, though under ordinary circumstances the devices shown in Figures 2 and 3 would be preferred. Under some circumstances the packing gland and packing nut might be omitted as the lubricant and the ground or lapped fit of the metering cone would be sufficient to prevent leakage.

I claim:

1. In a valve, a truncated conical valve seat, a hollow conical valve seated for rotation therein, a plurality of metering apertures extending through the wall of the valve, aligned intake and discharge passages separated by and generally perpendicular to the body of the valve, the axis of rotation of the valve being inclined to the axes of said passages, a truncated conical hub located within and out of contact with the valve, one of said passages terminating in the conical wall of the hub, the hub being apertured, yielding means contained within said aperture and engaging the valve to yieldingly hold it on its seat.

2. In combination, a valve housing having a conical valve seat, a conical valve mounted for rotation therein, aligned intake and exhaust passages separated by the valve, metering apertures through the valve adapted to be selectively aligned with said passages by the rotation of the valve, a chamber encircling the valve, adjacent the stem, within the housing, and means for permitting the introduction of lubricant under pressure to said chamber to lubricate and to unseat the valve, a packing and packing sleeve encircling the stem, a hub held against rotation with respect to the stem having a flange enclosing the packing sleeve, yielding means interposed between the housing and the flange for yieldingly locking the valve stem against rotation and means interposed between the housing and valve for visually indicating the angular position of the valve.

3. In a valve, a two part flanged housing, there being a truncated conical valve seat concentric with the flange in one housing part and a truncated conical boss concentric with the flange projecting from the other housing part and penetrating the valve seat, a hollow truncated conical valve member rotatable on the seat and encircling the boss, a plurality of metering apertures extending through the valve member, a valve stem concentric with and supporting the valve member and rotatable in the part of the housing which contains the valve seat, the meeting plane of the flanges being intersected by the axis of rotation of the valve and valve stem, there being two straight aligned passages, one in each housing part, their common axis intersecting the valve body, said passages terminating respectively in the opposed walls of the valve seat and the boss and means for rotating the valve stem to bring successive metering apertures in alignment with said passages.

4. In a valve, a two part flanged housing, there being a truncated conical valve seat concentric with the flange in one housing part and a truncated conical boss concentric with the flange projecting from the other housing part and penetrating the valve seat, a hollow truncated conical valve member rotatable on the seat and encircling the boss, a plurality of metering apertures extending through the valve member, a valve stem concentric with and supporting the valve member and rotatable in the part of the housing which contains the valve seat, the meeting plane of the flanges being intersected by the axis of rotation of the valve and valve stem, there being two straight aligned passages, one in each housing part, their common axis intersecting the valve body, said passages terminating respectively in the opposed walls of the valve seat and the boss and means for rotating the valve stem to bring successive metering apertures in alignment with said passages, the axis of rotation of the valve body, the axes of the metering apertures and the common axis of the passages in the valve body all intersecting in the meeting plane of the flanges.

5. In a valve, a two part flanged housing, there being a truncated conical valve seat concentric with the flange in one housing part and a truncated conical boss concentric with the flange projecting from the other housing part and penetrating the valve seat, a hollow truncated conical valve member rotatable on the seat and encircling the boss, a plurality of metering apertures extending through the valve member, a valve stem concentric with and supporting the valve member and rotatable in the part of the housing which contains the valve seat, the meeting plane of the flanges being intersected by the axis of rotation of the valve and valve stem, there being two straight aligned passages, one in each housing part, their common axis intersecting the valve body, said passages terminating respectively in the opposed walls of the valve seat and the boss and means for rotating the valve stem to bring successive metering apertures in alignment with said passages, yielding means for holding the valve body against its seat and for maintaining a substantially fixed clearance between the inner periphery of the valve body and the conical hub.

6. In a valve, a two part flanged housing, there being a truncated conical valve seat concentric with the flange in one housing part and a truncated conical boss concentric with the flange projecting from the other housing part and penetrating the valve seat, a hollow truncated conical valve member rotatable on the seat and encircling the boss, a plurality of metering apertures extending through the valve member, a valve stem concentric with and supporting the valve member and rotatable in the part of the housing which contains the valve seat, the meeting plane of the flanges being intersected by the axis of rotation of the valve and valve stem, there being two straight aligned passages, one in each housing part, their common axis intersecting the valve body, said passages terminating respectively in the opposed walls of the valve seat and the boss and means for rotating the valve stem to bring successive metering apertures in alignment with said passages, a packing gland encircling the valve stem, a closed chamber formed at the smallest diametrical portion of the valve seat encircling the valve stem and the valve body where they join and extending outwardly toward the metering passages, means for permitting the introduction of lubricant under pressure to said chamber to lubricate and unseat the valve.

PAUL E. MADDEN.